United States Patent
Oonishi

(10) Patent No.: US 11,112,774 B2
(45) Date of Patent: Sep. 7, 2021

(54) NUMERICAL CONTROLLER

(71) Applicant: Fanuc Corporation, Yamanashi (JP)

(72) Inventor: Nobuhito Oonishi, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 0 days.

(21) Appl. No.: 16/819,689

(22) Filed: Mar. 16, 2020

(65) Prior Publication Data

US 2020/0319887 A1    Oct. 8, 2020

(30) Foreign Application Priority Data

Apr. 5, 2019   (JP) .............................. JP2019-073047

(51) Int. Cl.
  *G05B 19/418*   (2006.01)
  *G06F 9/38*     (2018.01)

(52) U.S. Cl.
  CPC ......... *G05B 19/418* (2013.01); *G06F 9/3802* (2013.01); *G05B 2219/13098* (2013.01)

(58) Field of Classification Search
  CPC ........ G05B 19/418; G05B 2219/13098; G06F 9/3802
  See application file for complete search history.

(56) References Cited

U.S. PATENT DOCUMENTS 5,619,663 A * 4/1997 Mizrahi-Shalom ... G06F 9/3802
                                                    711/125
2008/0294877 A1* 11/2008 Haga .................. G05B 19/4155
                                                    712/216

FOREIGN PATENT DOCUMENTS

| JP | 0969003 A    | 3/1997  |
|----|--------------|---------|
| JP | 2007094936 A | 4/2007  |
| JP | 2008293261 A | 12/2008 |

* cited by examiner

*Primary Examiner* — Christopher E. Everett
(74) *Attorney, Agent, or Firm* — RatnerPrestia

(57) ABSTRACT

A numerical controller determines whether or not block prefetching from a program is sufficient based on whether at least one block subsequent to a predetermined reference block, which exists after a running block of the program and is needed to execute the reference block, has been prefetched or not. If the determination result is that prefetching is not sufficient, block prefetching from the program is performed.

5 Claims, 9 Drawing Sheets

FIG.7

```
O0100
...
N0100 #100=[#_TIME]
...
N0500 #101=[#_TIME]
N0510 #500=#101-#100
N0520 IF[#500 LE 10000]#3000=123(ALARM)
N0530 X101.01
Y202.02
...
```

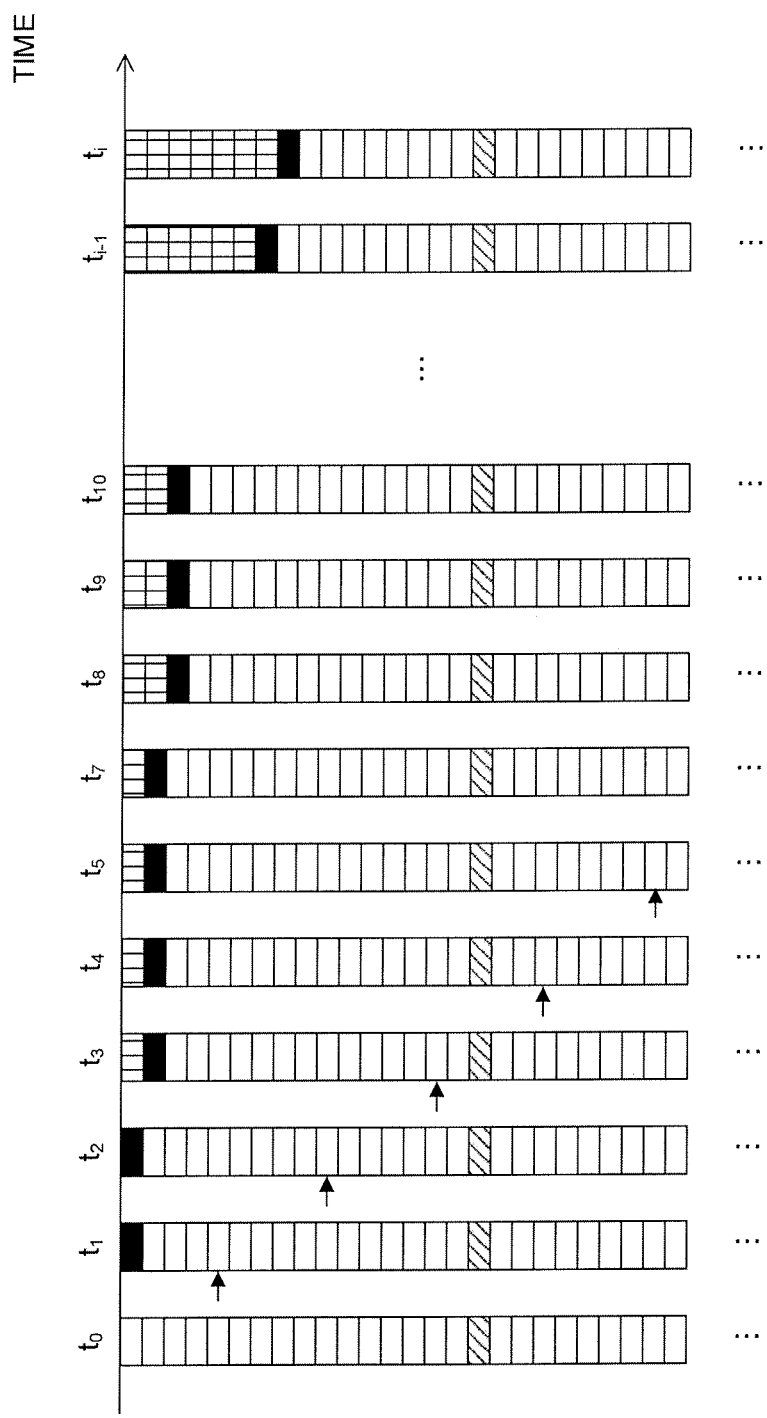

NUMERICAL CONTROLLER

RELATED APPLICATIONS

The present application claims priority to Japanese Patent Application Number 2019-073047 filed Apr. 5, 2019, the disclosure of which is hereby incorporated by reference herein in its entirety.

BACKGROUND OF THE INVENTION

1. Field of the Invention

The present invention relates to a numerical controller, and particularly to a numerical controller having a program prefetch function.

2. Description of the Related Art

Some numerical controllers have a prefetch function that pre-reads blocks of a program into a memory to perform pre-analysis before the execution of the block (for example, see Japanese Patent Application Laid-Open Nos. 09-069003, 2007-094936, and 2008-293261). The prefetch function enables a correction function and speed control that take into account a commanded shape or a speed command of a block to be executed in a later part of the program.

For example, in a technique disclosed in Japanese Patent Application Laid-Open No. 09-069003, multiple blocks of a program are prefetched when tool radius compensation is performed and, if the correction causes the interference between the tool and a workpiece in any of the prefetched command blocks, correction direction and correction amount are changed to avoid the interference between the tool and the workpiece.

A technique disclosed in Japanese Patent Application Laid-Open No. 2007-094936 performs speed control that prevents rapid deceleration and the like, by prefetching multiple blocks of a program and taking into account a commanded speed to be commanded in a later part of the program.

In the case where a prefetch function is enabled, a macro statement included in a program is processed upon being prefetched and analyzed. Accordingly, if the macro statement needs to be processed when the block is executed, a measure has to be taken, such as the insertion of a buffering prohibit command immediately before the block. For example, in the case where a macro statement for performing branch processing based on the position of an axis after the execution of an immediately preceding block is finished is processed upon being prefetched and analyzed, the branch processing may be performed based on a wrong position of the axis, which is obtained before the immediately preceding block is executed, and intended processing may not be executed. In such a case, a buffering prohibit command is inserted immediately before the block so that the block may be processed after the execution of the immediately preceding block is finished.

Inserting a buffering prohibit command into a program causes prefetching to stop at a block containing the command, thus influencing the correction function and the speed control described above. Accordingly, in the case where a macro statement does not have to be executed with strict timing or where prefetching should be given high priority, a program without a buffering prohibit command may intentionally be written. Meanwhile, in some cases, a program incidentally works without a problem despite a buffering prohibit command not being inserted into a proper place because of just a lack of understanding of characteristics of prefetching.

FIG. 7 is a view illustrating an example of a program including macro statements.

In the program illustrated in FIG. 7, macro statements in blocks N0100 and N0500 obtain the time when the macro statements are processed, and assign the time to variables #100 and #101. Then, in block N0510, the difference between variables #100 and #101 is calculated to be assigned to variable #500. This variable #500 represents the time necessary to execute blocks existing between block N0100 and block N0500. In such a program, to obtain the accurate time necessary to execute blocks between block N0100 and block N0500, buffering prohibit commands actually need to be inserted immediately before block N0100 and immediately before block N0500. However, since the program works without a large problem even if an operator has forgotten to insert the buffering prohibit commands, actual work may be performed without knowing that.

Generally, a prefetch function executes prefetching as much as the processing capability thereof allows until a prefetch buffer prepared in advance is filled up. Accordingly, in the case where the above-described buffering prohibit command is not inserted in the program, the temporal gap between the timing of processing of the macro statement and the timing (timing with which a command of a block immediately before or after the macro statement is outputted to a machine tool or a peripheral device) of actual execution of a block immediately before or after the macro statement increases with increasing buffer size of the prefetch buffer.

FIGS. 8 and 9 are diagrams illustrating the prefetching and execution of blocks of a program.

FIG. 8 illustrates an example in which a buffer capable of storing data on 10 prefetched blocks is prepared. FIG. 9 illustrates an example in which a buffer capable of storing data on 100 prefetched blocks is prepared. In FIGS. 8 and 9, one rectangle represents one block, and a program is represented by a plurality of rectangles (blocks) that are vertically stacked.

In FIGS. 8 and 9, states of the prefetching and execution of blocks of a program are arranged in temporal order from left to right. The blocks of the program are prefetched in order from the top and executed in order from the top. In FIGS. 8 and 9, rectangles with diagonal hatch lines are assumed to be blocks containing macro statements, and other blocks are assumed to be general NC blocks. Solid black rectangles are assumed to represent currently running blocks, and rectangles with vertical hatch lines are assumed to represent already-executed blocks. Blocks up to a block indicated by an arrow are assumed to be prefetched into the prefetch buffer. For example, in FIG. 8, the program starts to be prefetched and executed at time $t_0$; and, at time $t_1$, blocks up to the fifth block have been prefetched into the buffer and the first block is being executed.

Here, in the example (in which 10 blocks can be prefetched) illustrated in FIG. 8, 10 blocks from the currently running block are prefetched. At time $t_0$, at which the program is started, prefetching is performed in order from the leading block of the program, and the first block is executed. Then, at time $t_2$, at which the tenth block has been prefetched, the buffer is filled up, and prefetching stops. At this stage, the first block is being executed. Then, when the execution of the first block is finished, an area of the buffer which has been used to prefetch the first block is released, and the eleventh block is prefetched. In this way, the prefetching and execution of blocks proceed. At time $t_1$, at which the execution of the seventh block is finished and the eighth block is executed, the seventeenth block (rectangle with diagonal hatch lines) is prefetched and analyzed (macro statement is processed at this time).

Meanwhile, in the example (in which 100 blocks can be prefetched) illustrated in FIG. 9, 100 blocks from the currently running block are prefetched. At time to, at which the program is started, prefetching is performed in order from the leading block of the program, and the first block is executed. Then, for example, the seventeenth block (rectangle with diagonal hatch lines) of the program is prefetched and analyzed at time $t_4$ (macro statement is processed at this time). At this time, the second block is being executed.

As described above, in the case where a buffer for storing data on prefetched blocks has a large buffer size, the temporal gap between the timing of prefetching of a block and the timing of execution of the block is larger than in the case where a buffer has a small buffer size. Accordingly, when a program without a buffering prohibit command is run on a numerical controller in which a buffer for storing data on prefetched blocks has a large buffer size, a large difference due to a temporal gap between an expected execution result and an actual execution result may occur, which becomes problem. For example, when the program of FIG. 7 is executed on a numerical controller in which a buffer for storing data on prefetched blocks has a small buffer size, a value assigned to variable #500 greatly differs from that in the case where the program is executed on a numerical controller having a large buffer size. This great difference may lead to a difference between execution results (results of determination in block N0520).

SUMMARY OF THE INVENTION

To minimize the occurrence of such a problem, prefetch control is desirably performed so that prefetches that are not always necessary may be avoided while prefetching needed in functions (such as speed control) that require prefetching is given high priority. This is because prefetches that are not always necessary may cause adverse effects such as making an execution result wrong.

Moreover, in the case where a buffer for storing data on prefetched blocks has a large buffer size, another problem in that a load induced by a process for analyzing prefetched blocks is concentrated at the program execution start time may occur. For example, in the case where two or more programs simultaneously start to be executed on a multi-path system, loads induced by program analysis processes in the respective paths are concentrated at the program execution start time, and the processes may influence each other. Accordingly, loads are preferably distributed in terms of time during a period in which the programs are being executed. From this viewpoint, it is also better not to perform prefetches that are not always necessary.

Accordingly, there are demands for a numerical controller that performs control so as to prefetch an appropriate number of blocks based on the state of a currently running program.

A numerical controller according to one aspect of the present invention continues prefetching until a required number (depending on a block) of blocks for the execution of a predetermined block after a currently running block are secured (prefetched and analyzed), and stops prefetching when the required number of blocks are secured, thereby solving the above-described problem.

A numerical controller according to the present invention has a function of prefetching blocks of a program, and includes a prefetch sufficiency determination section and a prefetch analysis section. The prefetch sufficiency determination section determines whether or not block prefetching from the program is sufficient based on whether or not at least one block subsequent to a predetermined reference block existing after a running block of the program has been prefetched, the at least one block being needed to execute the reference block. The prefetch analysis section performs block prefetching from the program if the prefetch sufficiency determination section determines that block prefetching from the program is not sufficient.

In the case where the reference block issues an axis feed command, the prefetch sufficiency determination section may determine that block prefetching from the program is sufficient if an axis can be stopped before execution of the at least one prefetched block is finished when the axis is moved at a speed limit specified by the command.

The prefetch sufficiency determination section may determine whether or not block prefetching from the program is sufficient based on any one of a required number of blocks and a formula for calculating a required number of blocks set for any one of each command and each function.

The reference block may be statically set in advance in relation to the running block.

The numerical controller may further include a reference block setting section that dynamically sets the reference block based on a state of execution of the running block or time necessary to execute the at least one prefetched block.

With the present invention, an appropriate number of blocks can be prefetched based on a state of a currently running program.

BRIEF DESCRIPTION OF THE DRAWINGS

FIG. 7 is a view illustrating an example of a program including macro statements.

FIG. 9 is a diagram illustrating another example of the prefetching and execution of blocks of a program.

DETAILED DESCRIPTION OF THE PREFERRED EMBODIMENTS

Figure 1:
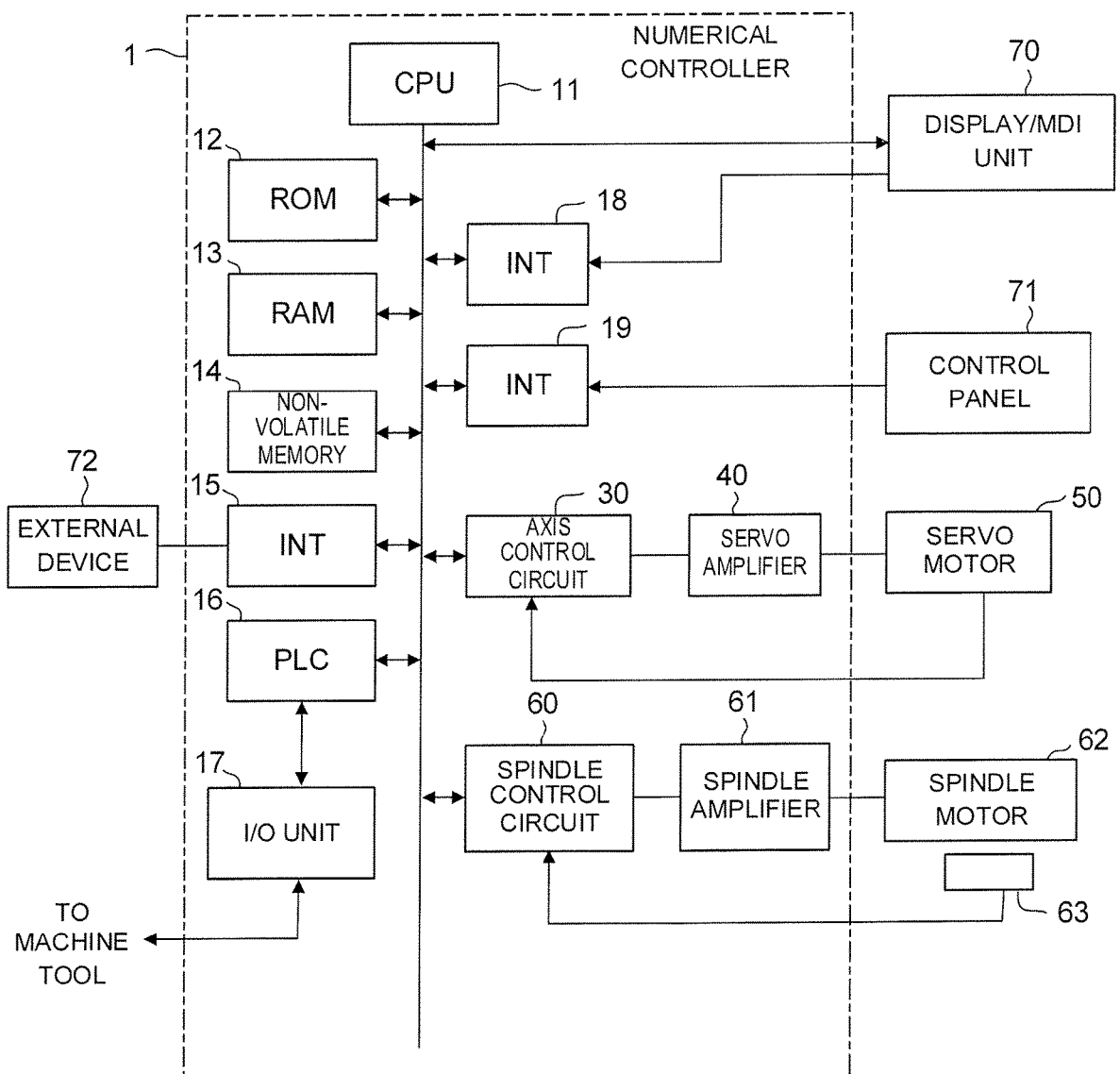
FIG. 1 is a hardware configuration diagram schematically illustrating a numerical controller according to one embodiment.

FIG. 1 is a hardware configuration diagram schematically illustrating principal portions of a numerical controller according to one embodiment of the present invention.

A numerical controller 1 of the present invention can be implemented as, for example, a numerical controller that controls a machine tool based on a program.

A CPU 11 of the numerical controller 1 according to this embodiment is a processor that wholly controls the numerical controller 1. The CPU 11 retrieves system programs stored in a ROM 12 through a bus 20, and controls the entire numerical controller 1 in accordance with the system programs. A RAM 13 temporarily stores temporary data such as calculation data and display data, various externally inputted data, and the like.

A non-volatile memory 14, which is configured as, for example, a memory or a solid state drive (SSD) that has a battery (not shown) for memory backup, maintains the state of memory even when the power of the numerical controller 1 is shut off. The non-volatile memory 14 stores programs read from an external device 72 through an interface 15, programs inputted through a display/MDI unit 70, and the like. Such programs and various kinds of data stored in the non-volatile memory 14 may be developed in the RAM 13 at the time of execution/use. The ROM 12 stores various prewritten system programs such as a publicly-known analysis program.

The interface 15 is an interface for connecting the CPU 11 of the numerical controller 1 and the external device 72, such as a USB device. Programs, various parameters, and the like that are used in the control of the machine tool are read from the external device 72. Programs, various parameters, and the like edited in the numerical controller 1 can be stored in external storage means (not shown) through the external device 72. A programmable logic controller (PLC) 16 outputs signals to the machine tool (not shown) and peripheral devices (for example, a tool changer, an actuator of a robot or the like, a sensor attached to the machine tool, or the like) of the machine tool through an I/O unit 17 in accordance with a built-in sequence program of the numerical controller 1 to control the machine tool and the peripheral devices. The PLC 16 receives signals from various switches on a control panel provided on a main body of the machine tool, peripheral devices, and the like, and passes the signals to the CPU 11 after performing necessary signal processing.

The display/MDI unit 70 is a manual data input device having a display, a keyboard, and the like. An interface 18 receives commands and data from the keyboard of the display/MDI unit 70, and passes the commands and the data to the CPU 11. An interface 19 is connected to a control panel 71 having a manual pulse generator or the like that is used to manually drive each axis.

An axis control circuit 30 for controlling an axis of the machine tool receives a commanded amount of travel for the axis from the CPU 11, and outputs a command for the axis to a servo amplifier 40. The servo amplifier 40 receives this command, and drives a servo motor 50 for moving the axis of the machine tool. The servo motor 50 of the axis incorporates a position and speed detector, and feeds a position and speed feedback signal received from the position and speed detector back to the axis control circuit 30 to perform position and speed feedback control. It should be noted that the hardware configuration diagram in FIG. 1 illustrates only one axis control circuit 30, one servo amplifier 40, and one servo motor 50, but actually the same numbers of axis control circuits 30, servo amplifiers 40, and servo motors 50, as the number of axes of the machine tool that are to be controlled are prepared.

A spindle control circuit 60 receives a spindle rotation command, and outputs a spindle speed signal to a spindle amplifier 61. The spindle amplifier 61 receives the spindle speed signal, and rotates a spindle motor 62 of the machine tool at the commanded rotational speed to drive the tool. A position coder 63 is coupled to the spindle motor 62. The position coder 63 outputs a feedback pulse in synchronization with the rotation of the spindle. The feedback pulse is read by the CPU 11.

Figure 2:
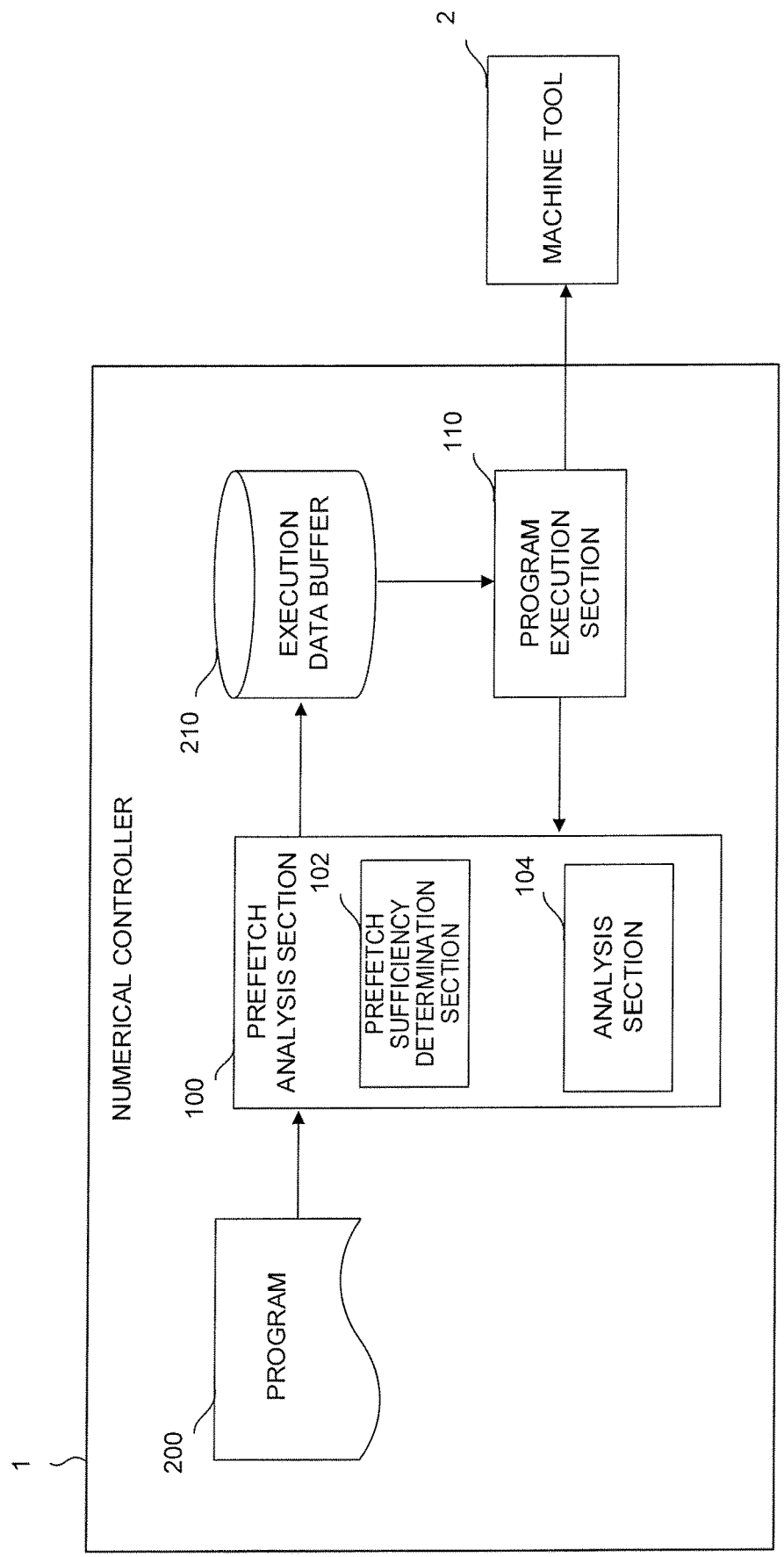
FIG. 2 is a functional block diagram schematically illustrating a numerical controller according to a first embodiment.

FIG. 2 is a functional block diagram schematically illustrating the numerical controller 1 according to a first embodiment of the present invention.

Each functional block illustrated in FIG. 2 is implemented by the CPU 11 of the numerical controller 1 illustrated in FIG. 1 executing system programs to control the operation of each section of the numerical controller 1.

The numerical controller 1 of this embodiment includes a prefetch analysis section 100 and a program execution section 110. A program 200 for use in the control of a machine tool 2 is stored in advance in the non-volatile memory 14. An execution data buffer 210, which stores execution data needed to execute blocks of the program, is provided on the RAM 13 or the non-volatile memory 14.

The prefetch analysis section 100 is implemented by the CPU 11 of the numerical controller 1 illustrated in FIG. 1 that executes system programs read from the ROM 12 to perform arithmetic processing using the RAM 13 and the non-volatile memory 14 mainly by the CPU 11. The prefetch analysis section 100 prefetches and analyzes blocks of the program 200, and passes execution data obtained as the result of the analysis to the execution data buffer 210. If the execution data buffer 210 has a free space and a prefetch sufficiency determination section 102, which will be described later, determines that a block or blocks needed to execute a reference block have not been prefetched, the prefetch analysis section 100 prefetches a block or blocks of the program 200. The prefetch analysis section 100 includes the prefetch sufficiency determination section 102 and an analysis section 104.

The prefetch sufficiency determination section 102 determines whether or not block prefetching from the program 200 is sufficient. The prefetch sufficiency determination section 102 determines whether or not prefetching is sufficient based on whether or not a block or blocks that are needed for a reference block serving as a reference for prefetch sufficiency determination, which is one of already-prefetched blocks, to work have been prefetched. The reference block may be, for example, a block immediately after a block that the program execution section 110 is currently executing, or a block two or three blocks after the block that the program execution section 110 is currently executing. The reference block may be statically set in advance in a setting area provided in the non-volatile memory 14 in relation to the block that the program execution section 110 is currently executing. When a block set as the reference block has not been prefetched, the prefetch sufficiency determination section 102 always determines that prefetching is not sufficient.

In the case where the reference block is, for example, a block that issues an axis feed command, the prefetch sufficiency determination section 102 determines whether or not prefetching is sufficient based on whether or not a block or blocks sufficient to reach a sufficient speed in the axis feed command in the reference block have been prefetched.

The relationship between block prefetching and a restriction on axis feedrate will be described with reference to FIGS. 3A, 3B, and 4.

Figure 3A:
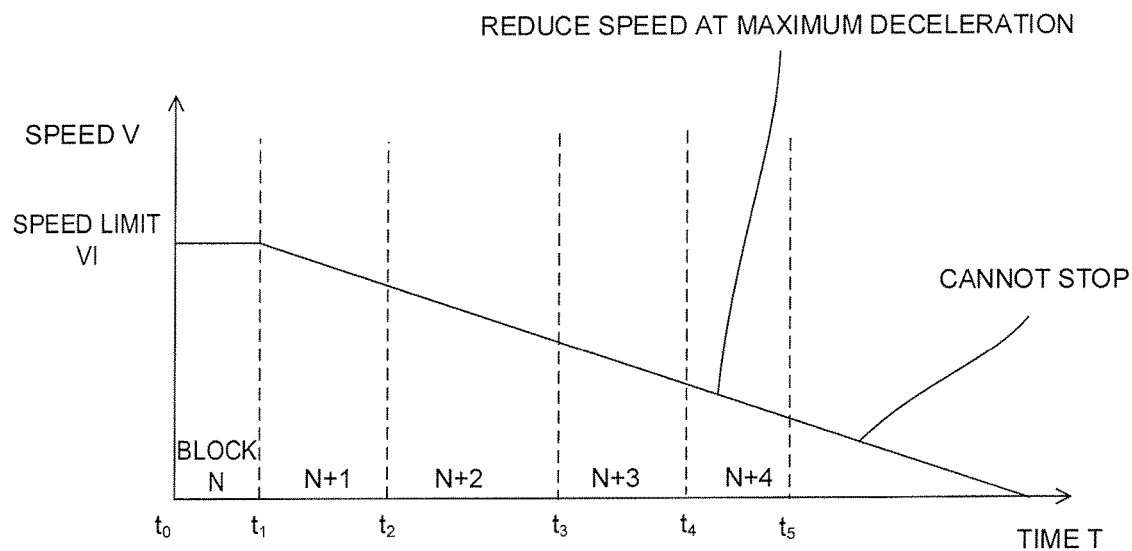
FIGS. 3A and 3B are diagrams illustrating cases where the movement of an axis cannot be stopped during a period in which prefetched blocks are being executed.
Figure 3B:
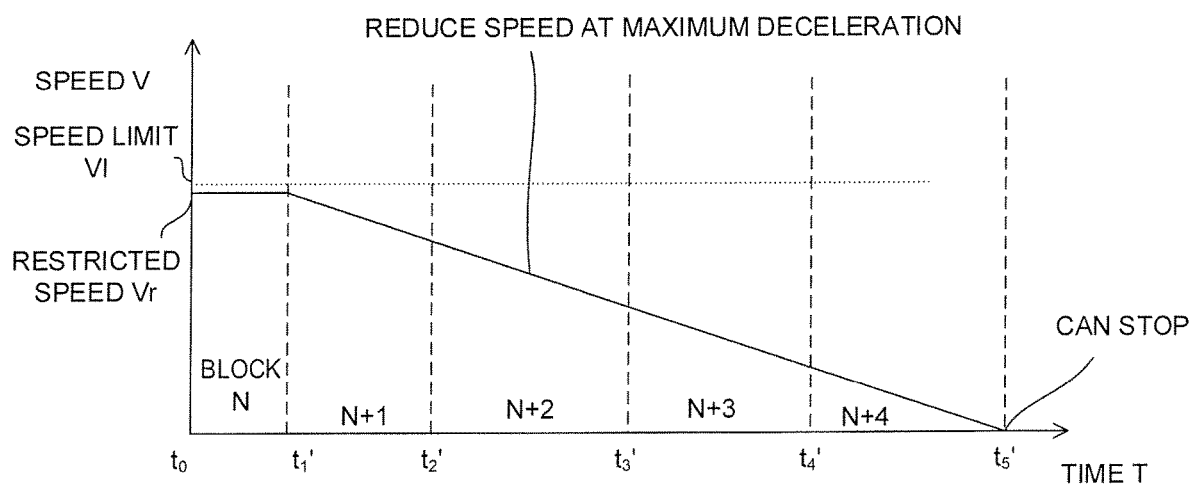
Figure 4:
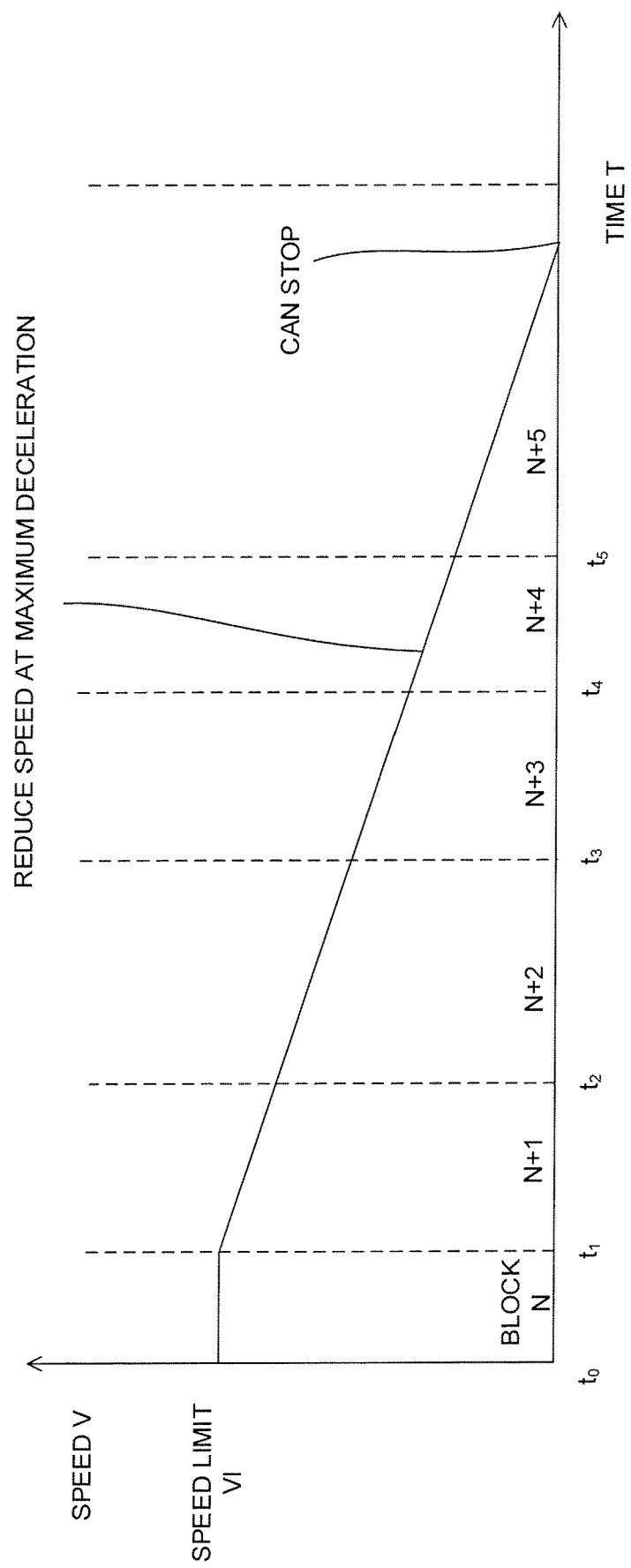
FIG. 4 is a diagram illustrating a case where the movement of the axis can be stopped during a period in which prefetched blocks are being executed.

FIGS. 3A, 3B, and 4 illustrate the relationship between speed and time in the case where an axis is moved in the reference block N and then stopped. In examples of FIGS. 3A, 3B, and 4, the reference block N is an axis feed command, and a speed limit for the command is set to Vl. The horizontal axis represents the time necessary to execute blocks. For example, in the case where the execution of block N+1 is started while the axis is moving at the speed limit Vl and block N+1 is executed while the speed is being reduced at a maximum deceleration, the time necessary to execute block N+1 is $(t_2-t_1)$. The speed limit Vl is set based on, for example, a maximum speed value set as a maximum speed of the axis in the numerical controller 1 or the machine tool 2, a command value in each block, and other factors. The above-described relationship between speed and time in the case where the axis is stopped can be calculated by analyzing prefetched blocks.

In the examples of FIGS. 3A and 3B, blocks up to block N+4 are prefetched from the program 200. At this time, in the case where the axis is fed at the speed limit Vl in the reference block N, the axis cannot be stopped by the end time $t_5$ (that is, the start time of block N+5) of block N+4 even if the speed is reduced at a maximum deceleration that is set for the axis and calculated from values including a maximum deceleration of each axis, as illustrated in the graph of FIG. 3A. Accordingly, in the case where blocks up to block N+4 have been prefetched, the speed in block N is restricted to a speed Vr that ensures the stop of the axis feed by time $t_5'$, at which the execution of block N+4 is finished, as illustrated in the graph of FIG. 3B. In such a case, since a block or blocks sufficient to reach a sufficient speed in the axis feed command in the reference block N have not been prefetched, the prefetch sufficiency determination section 102 determines that prefetching is not sufficient.

In the example of FIG. 4, blocks up to block N+5 are prefetched from the program 200. At this time, in the case where the axis is fed at the speed limit Vl in the reference block N and where, for example, the axis needs to be stopped in block N+6, which has not been prefetched, the axis can be stopped by the start time of block N+6 if the speed is reduced at the maximum deceleration that is set for the axis. Accordingly, in the situation where blocks up to block N+5 have been prefetched, the feedrate of the axis does not need to be restricted in block N, and the speed can be increased to the speed limit Vl. In such a case, since a block or blocks sufficient to reach a sufficient speed in the axis feed command in the reference block N have been prefetched, the prefetch sufficiency determination section 102 determines that prefetching is sufficient.

Other than the above-described prefetch sufficiency determination based on the axis feedrate, the prefetch sufficiency determination section 102 may determine whether or not prefetching is sufficient based on whether or not an appropriate number of blocks required for the command of the reference block have been prefetched, using the required number of blocks that is, for example, predetermined for each command. Alternatively, the prefetch sufficiency determination section 102 may determine whether or not prefetching is sufficient based on whether or not an appropriate number of blocks required for a function (such as tool radius compensation function or curve approximation function) that is currently being used in the numerical controller 1 have been prefetched. In the case of the tool radius compensation function, to prevent a difference in level between blocks, the interference between the tool and a workpiece, and the like from being caused by tool radius compensation, at least two subsequent blocks need to be prefetched to analyze a compensated path. In the case of the curve approximation function, a curve approximated from a series of commanded points commanded by a plurality of blocks is calculated using a predetermined algorithm, and an appropriate number of blocks that are required for the algorithm or that command a sufficient number of commanded points that are sufficient to calculate a correct approximated curve by the algorithm need to be prefetched. In the case where a required number of blocks for each command or each function is used as described above, the required number of blocks or a formula for calculating the required number of blocks for each command or each function may be set in a setting area provided on the non-volatile memory 14 in advance.

The analysis section 104 analyzes blocks prefetched from the program 200 and storing execution data obtained as the result of analysis in the execution data buffer 210. The execution data buffer 210 stores information such as modal information on each prefetched block, the amount of travel of each axis, the commanded number of revolutions of the spindle, and feedrate. The analysis of blocks performed by the analysis section 104 means conversion of blocks as source code into object code as execution data which can be recognized by the computer. This conversion includes the steps of (1) lexical analysis, (2) macro analysis, (3) macro execution, (4) syntactic analysis, (5) semantic analysis, (6) object code generation, (7) optimization, and the like. Details of analysis processing by the analysis section 104 are thoroughly described in, for example, Japanese Patent Application Laid-Open No. 2008-293261, and will therefore be omitted in the specification of the present application.

The program execution section 110 is implemented by the CPU 11 of the numerical controller 1 illustrated in FIG. 1 executing system programs read from the ROM 12 to perform arithmetic processing using the RAM 13 and the non-volatile memory 14 mainly by the CPU 11 and processing for controlling the machine tool 2 by the axis control circuit 30, the spindle control circuit 60, the PLC 16, and the like. The program execution section 110 controls the operation of the machine tool 2 based on the execution data stored in the execution data buffer 210. The program execution section 110 has functions for general control needed to control various sections of the machine tool 2, such as outputting, to each of motors that drive the axes of the machine tool 2, a movement command for each control period based on the execution data, controlling peripheral devices of the machine tool 2, and the like. The program execution section 110 also has the function of notifying the prefetch analysis section 100 of the block which is currently being executed.

The numerical controller 1 having the above-described configuration according to this embodiment can perform control so as to prefetch an appropriate number of blocks required for a predetermined reference block based on the state of the currently running program. This prevents blocks from being prefetched more than necessary, and minimizes the influence of prefetching that exerts on the execution of macros. Moreover, since blocks are neither prefetched nor analyzed more than necessary, load concentration is reduced during program execution. For example, the influence of prefetching that exerts on cooperation between programs is expected to be reduced.

Figure 5:
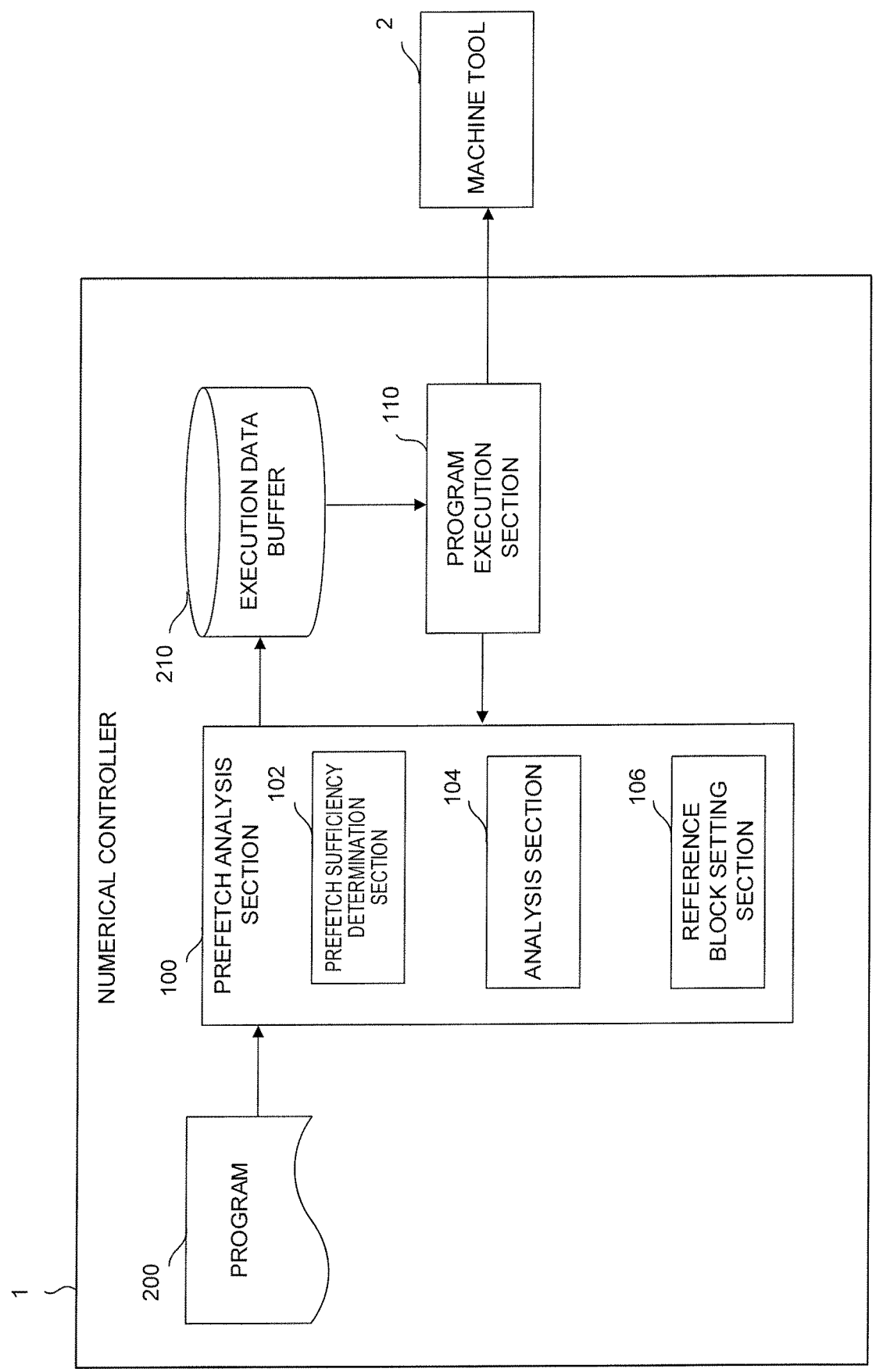
FIG. 5 is a functional block diagram schematically illustrating a numerical controller according to a second embodiment.

FIG. 5 is a functional block diagram schematically illustrating the numerical controller 1 according to a second embodiment of the present invention.

Each functional block illustrated in FIG. 5 is implemented by the CPU 11 of the numerical controller 1 illustrated in FIG. 1 executing system programs to control the operation of each section of the numerical controller 1.

The numerical controller 1 of this embodiment differs from the numerical controller 1 according to the first embodiment in that the prefetch analysis section 100 further includes a reference block setting section 106.

The reference block setting section 106 dynamically sets, based on the state of execution of a currently running block and the time necessary to execute prefetched blocks, a reference block that is used by the prefetch sufficiency determination section 102 as a reference for determining whether or not block prefetching from the program 200 is sufficient. The reference block setting section 106 may set the reference block based on, for example, the time necessary to execute the currently running block and the time necessary to execute each prefetched block.

Figure 6:
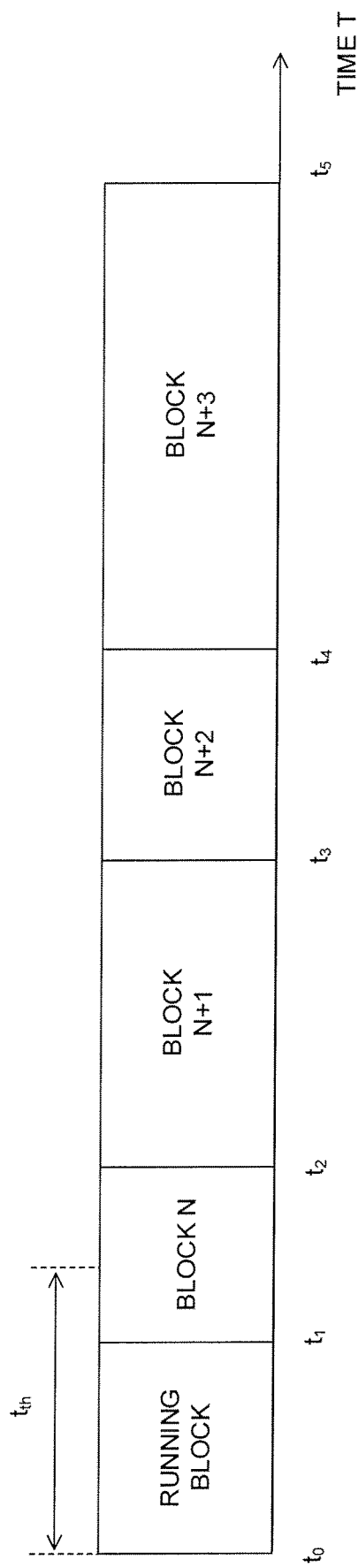
FIG. 6 is a diagram for explaining how to set a reference block.
Figure 8:
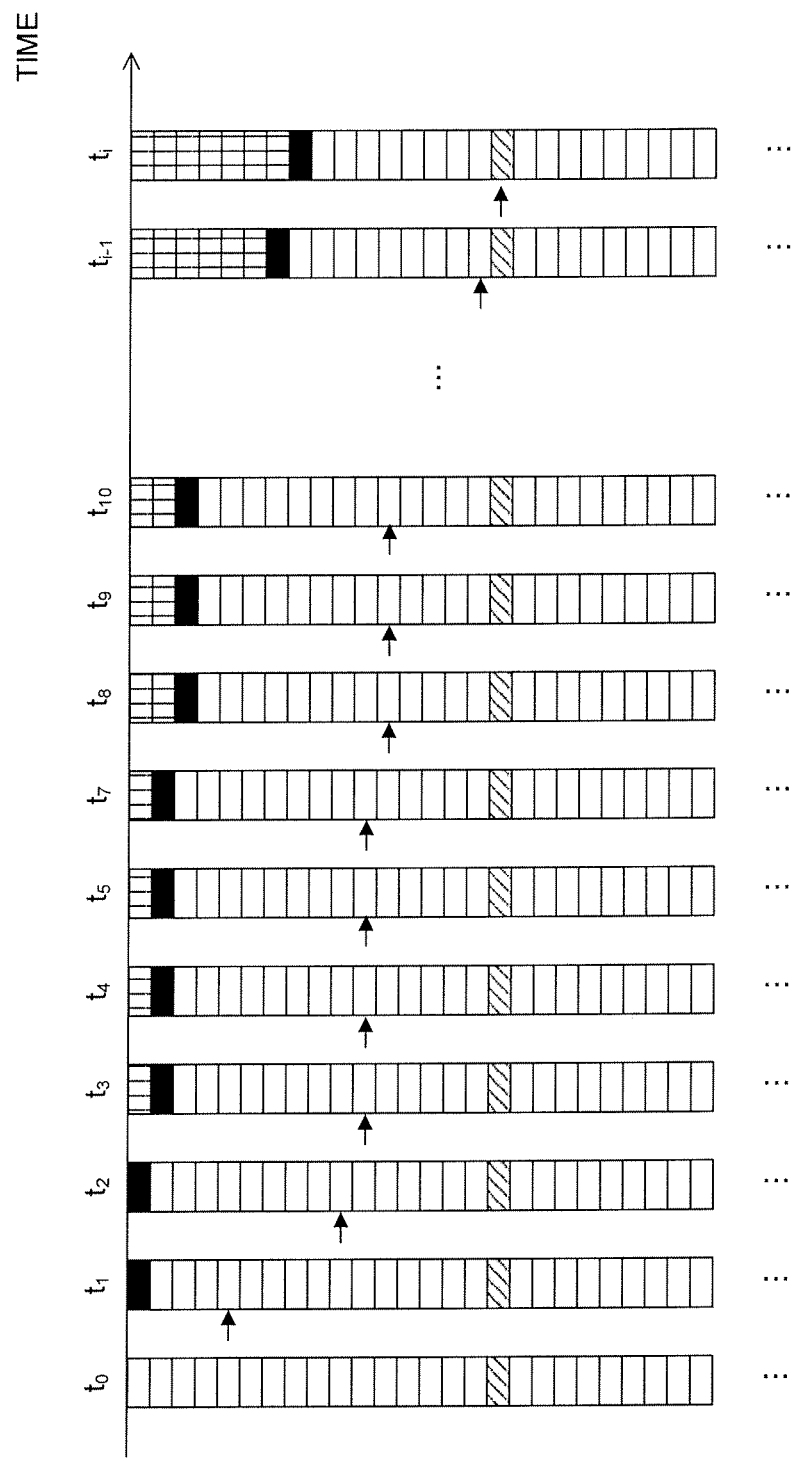
FIG. 8 is a diagram illustrating an example of the prefetching and execution of blocks of a program.

FIG. 6 is a diagram illustrating the time necessary to execute each of a running block and prefetched blocks N to N+3.

The reference block setting section 106 sets, based on, for example, a threshold $t_{th}$ of the time necessary for prefetch analysis that is set in advance in a setting area of the non-volatile memory 14, a block immediately after a block that can be executed during the time equal to the threshold $t_{th}$, as reference block. In the example of FIG. 6, when the time equal to the threshold $t_{t}h$ has elapsed, block N is expected to be already being executed, and therefore the reference block setting section 106 sets block N+1, which is a block immediately after block N, as a reference block.

In the numerical controller 1 according to the first embodiment, a reference block is statically set in advance, and prefetch sufficiency determination processing is performed based on the set reference block. However, in the case where the execution of a currently running block or a block subsequent to the running block is finished within a short period of time, for example, if setting of the block immediately after the running block as a reference block is made static, execution of the reference block may in some cases be under way or may have already been completed at the time when prefetch sufficiency determination processing is finished. Accordingly, in the numerical controller 1 according to this embodiment, such a problem can be prevented by providing the reference block setting section 106 that dynamically sets a reference block.

While embodiments of the present invention have been described above, the present invention is not limited to only the above-described exemplary embodiments, and can be carried out in various aspects by making appropriate modifications thereto.

The invention claimed is:

1. A numerical controller having a function of prefetching blocks of a program, the numerical controller comprising:
 a prefetch sufficiency determination section configured to determine whether or not block prefetching from the program is sufficient based on whether or not a predetermined number of blocks subsequent to a predetermined reference block existing after a currently running block of the program has been prefetched, the predetermined number of blocks being needed to execute the reference block; and
 a prefetch analysis section configured to perform block prefetching of the predetermined number of blocks subsequent to the reference block, which are required for the execution of the reference block, from the program when the prefetch sufficiency determination section determines that block prefetching from the program is not sufficient,
 wherein the predetermined number of blocks is a number of blocks to be set according to a state of the currently running program, and
 wherein the prefetch analysis section is configured to stop prefetching of blocks when the prefetch sufficiency determination section determines that the prefetching of the blocks from the program is sufficient.

2. The numerical controller according to claim 1, wherein in the case where the reference block issues an axis feed command, the prefetch sufficiency determination section determines that block prefetching from the program is sufficient if an axis can be stopped before execution of the at least one prefetched block is finished when the axis is moved at a speed limit specified by the command.

3. The numerical controller according to claim 1, wherein the prefetch sufficiency determination section determines whether or not block prefetching from the program is sufficient based on any one of a required number of blocks and a formula for calculating a required number of blocks set for any one of each command and each function.

4. The numerical controller according to claim 1, wherein the reference block is statically set in advance in relation to the running block.

5. The numerical controller according to claim 1, further comprising:
 a reference block setting section configured to dynamically set the reference block based on a state of execution of the running block or time necessary to execute the at least one prefetched block.

* * * * *